July 20, 1965  M. P. WOODWARD, JR  3,196,291
PRECISION A.C. TO D.C. CONVERTER
Filed March 18, 1963

Inventor:
Morton P. Woodward Jr.,
by Dudley ?. ?endy
His Agent.

United States Patent Office 3,196,291
Patented July 20, 1965

3,196,291
PRECISION A.C. TO D.C. CONVERTER
Morton P. Woodward, Jr., Vestal, N.Y., assignor to General Electric Company, a corporation of New York
Filed Mar. 18, 1963, Ser. No. 265,676
8 Claims. (Cl. 307—88.5)

This invention relates to electronic apparatus for converting A.C. signals to D.C. signals. The converter achieves precision operation which is particularly useful for test equipment and is characterized by its suitability for both sinusoidal and non-sinusoidal A.C. waveforms.

One way in which to convert an A.C. signal to a D.C. signal is to rectify the A.C. signal by means of rectifiers. However, rectifiers have two properties which lead to difficulties in obtaining accurate conversion. The first property is that presently obtainable rectifiers depart from the ideal unidirectional characteristic with a zero voltage drop for forward conduction and this characteristic varies with environmental conditions, particularly temperature. The second property is that rectifiers are two terminal devices and therefore rectifier circuitry does not generally isolate the input and output signals.

Some of the problems resulting from the non-ideal characteristics of rectifiers can be solved by the use of operational amplifiers with the rectifiers connected in feedback loops. This requires the use of a precision resistor in a feedback path in addition to the precision input resistor. Furthermore, there is uncertainty as to the actual input signal because of reverse current from part of the rectified signal passing back through the feedback rectifiers as a function of the signal duty cycle and the particular signal waveform.

Although there are ways in which the loss of rectified signals through the feedback rectifiers can be corrected, the conventional approach, such as the use of an additional operational amplifier and a precision filter network, require disproportionate complexity. Also, prior converters have generally had errors caused by rectifier leakage currents in the reverse direction.

Accordingly, it is an object of the invention to provide a simple precision A.C. to D.C. converter which obviates the problems resulting from the two-terminal nature and non-ideal characteristics of rectifiers.

It is a further object of the invention to provide a precision A.C. voltage to D.C. converter which requires a single precision resistor as the sole precision component.

It is another object of the invention to provide a precision converter circuit in which there is unidirectional signal propagation.

It is another object of the invention to provide a converter which compensates for rectifier leakage currents.

It is another object of the invention to provide a precision converter in which the output voltage is substantially higher than the average of a half wave rectified input signal.

Briefly stated, in accordance with certain aspects of the invention, an A.C. to D.C. converter is provided which utilizes an operational amplifier and unique circuitry to insure precision half wave rectification and unidirectional current flow. The operational amplifier receives an input voltage signal through a precision resistor and drives a coupling capacitor for the positive half cycles. A rectifier is connected in parallel with the amplifier and coupling capacitor so that the positive half cycles of the input signal are unidirectionally pumped to the output. A second rectifier is coupled to pass the operational amplifier output during the negative half cycles back to the amplifier input and to discharge the coupling capacitor. The unidirectional signal pumping is thereby achieved while the operational amplifier substantially eliminates the effect of the forward resistance of the rectifier.

The invention, together with further objects and advantages thereof, may best be understood by referring to the following description taken in conjunction with the appended drawing in which like numerals indicate like parts and in which.

Figure 1:
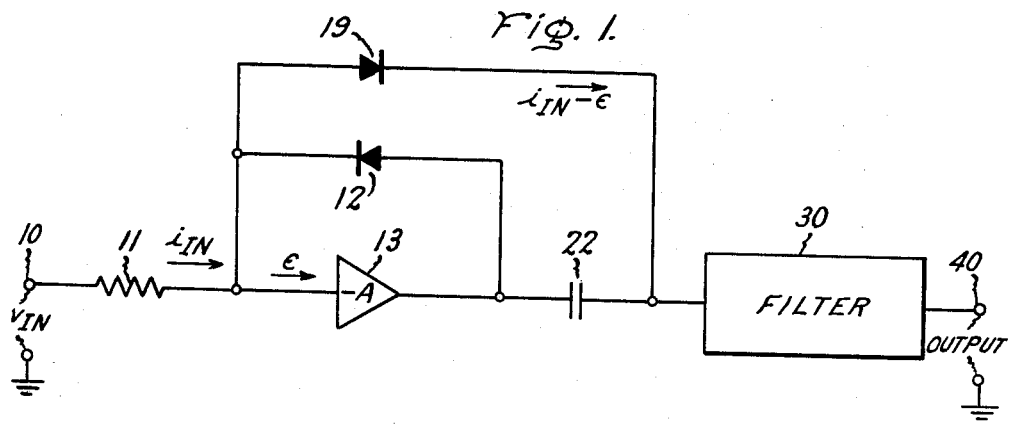
FIGURE 1 is a schematic diagram of the novel converter.

FIGURE 1 is a schematic diagram of a basic form of the A.C. to D.C. converter. The circuit operates as a precision half wave rectifier and voltage doubling network. Input A.C. voltage signals $v_{IN}$ applied to input terminal 10 are coupled through a precision input resistor 11 which derives an A.C. current signal, $i_{IN}$. This current signal is applied to an operational amplifier 13 and the amplifier output is applied to a coupling capacitor 22. The D.C. signal at output terminal 40 is smoothed by filter 30. Rectifiers are provided by a semiconductor diode 12 having its cathode connected to the input of operational amplifier 13 and its anode connected to the amplifier output and a semiconductor diode 19 having its anode connected to the operational amplifier input and its cathode connected between filter 30 and capacitor 22.

The critical operating characteristic of the FIGURE 1 converter is that it propagates input signals unidirectionally, regardless of signal waveforms or load impedances variations. The circuit provides half wave rectification by passing the positive half cycle through rectifier 19. Concurrently, the parallel operational amplifier 13 produces a negative current substantially equal in amplitude to the positive current through rectifier 19. These currents are applied to opposite sides of capacitor 22 which effectively results in voltage doubling. Because of this arrangement, all the positive current passing through input resistor 11 is applied to the output. Regardless of normal variations in the forward conduction of the rectifier 19, the input current is passed totally to the output. The operational amplifier 13 charges coupling capacitor 22 negatively until the input to the amplifier, $\epsilon$, is balanced substantially at ground. This results from positive current flowing through rectifier 19 which matches the negative current from amplifier 13. During the negative half cycle of the input, the rectifier 19 blocks. The circuit, after half wave rectification smooths the signal in filter 30, also clamps the signals so that a D.C. output relative to ground is produced.

Because of the low impedance of rectifier 12 in the forward direction and the high gain of amplifier 13, the input and output of amplifier 13 are maintained substantially at ground potential during the negative half cycle. Amplifier 13 and diode 12 insure operation such that capacitor 22 can not be charged by any negative input current and the negative half cycle of the input signal sees a blocking rectifier. Therefore, there is half wave rectification of the input A.C. signal.

Figure 2:
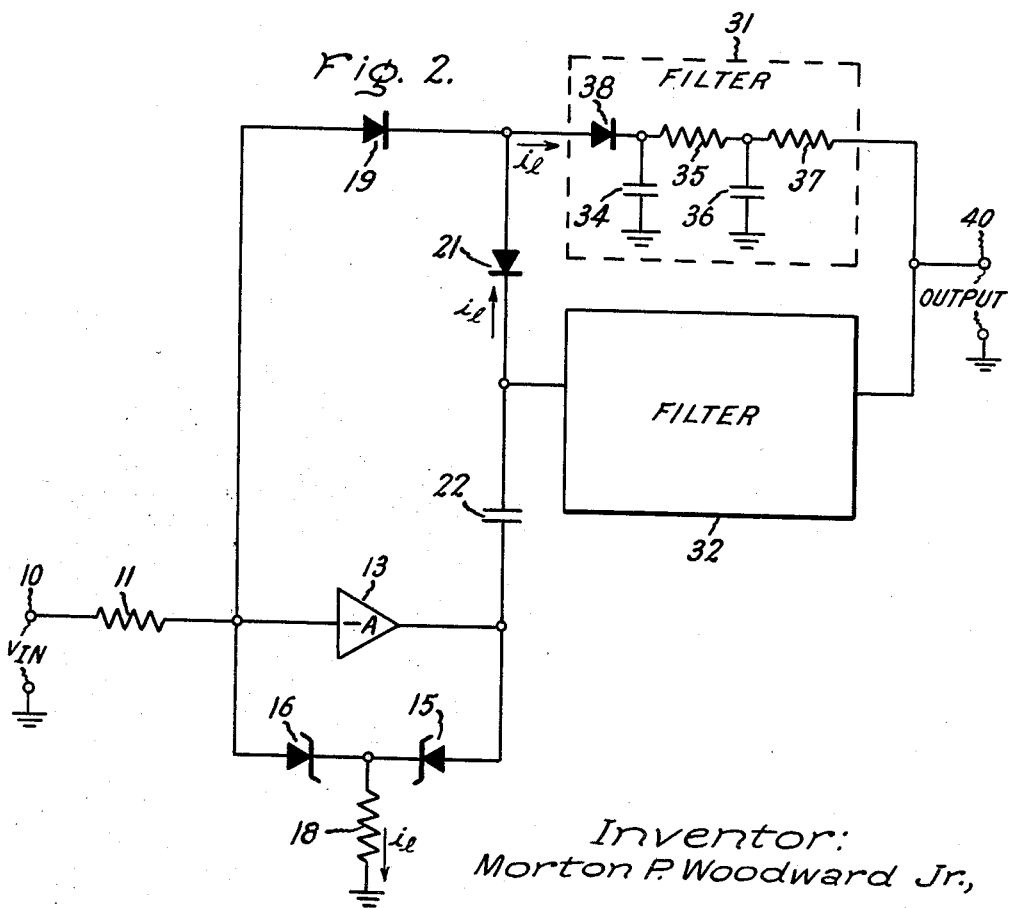
FIGURE 2 is a schematic diagram of an improved embodiment of the FIGURE 1 converter.

FIGURE 2 is a diagram of an A.C. to D.C. converter which is an improved version of the FIGURE 1 converter. Where the same components are retained the same reference characters are retained. The converter improvements are for the purpose of correcting for rectifier leakage currents and the prevention of saturation of the operational amplifier.

In the FIGURE 2 converter, the rectifier 19 of the FIGURE 1 converter is augmented by a second rectifier 21. The filter 30 is replaced by the two filters 31 and 32 which can be identical to the filter 30 and are connected between the anode and cathode, respectively, of rectifier 21 and the output terminal 40. The filters are conveniently comprised of a diode 38 and two RC filter sections, 34–37, which are serially connected. During the negative half cycle of the input signal, the output of operational amplifier 13 is a positive current which causes leakage currents $i_1$ through rectifiers 19 and 21. The leakage current is substantially eliminated as the small amount of leakage current through 21 is bypassed to output 40 through filter 31 with only a small voltage drop, and therefore the voltage across rectifier 19 is low, causing minimum errors.

In FIGURE 2, the zener diode 15 performs the same function as diode 12 in FIGURE 1. It also cooperates with the series opposing zener diode 16 and the bypass resistor 18 which is connected between the zener diode cathodes and ground. The operational amplifier 13 cannot saturate because the zener diodes prevent the amplifier output level from exceeding the zener breakdown level. Also, by virtue of bypass resistor 18, diode 15 leakage current $i_1$ are prevented from being applied to the input of amplifier 13.

It will be noted that in practicing the invention of FIGURES 1 and 2 the only precision component required is the input resistor 11 and even this component is unnecessary if the source of input signals is a current source. The operational amplifier 13 is conveniently a conventional cascaded transistor current amplifier. Preferably, the gain is on the order of 1,000,000 and is not critical. Examples of suitable standard amplifiers are described in Electronic Analog Computers, second edition, by Korn and Korn, McGraw-Hill, 1956, and some are shown in schematic form on pages 245–247. The filter components are not critical because it is driven by the half wave rectification circuitry which operates as a positive unidirectional current pump independent of the filter component values. In this connection, it can be noted that the function of the operational amplifier 13 may appear to be atypical in that it seems to forcibly pull current through rectifier 19 as opposed to the typical function of pushing out a desired current which is degeneratively coupled to the amplifier input through a feedback loop. The effective result remains the same—during the positive half cycle, current is drawn through the rectifier 19 which is substantially equal to the input current $i_{IN}$ because the current into the very high gain operational amplifier, $\epsilon$, is negligible. During the negative half cycle, none of the positive input current can be lost except the leakage currents through capacitor 22 and rectifier 19. The capacitor leakage current is negligible and, when the rectifier leakage current cannot be neglected, it is compensated for by the FIGURE 2 modifications.

The zener diodes need not be precision components because the breakdown voltage level only has to be within a range which is too low for the operational amplifier to saturate and yet higher than the voltage level of the operational amplifier error signal $\epsilon$.

While particular embodiments of the invention have been shown and described herein, it is not intended that the invention be limited to such disclosure, but that changes and modifications can be made and incorporated within the scope of the claims.

What is claimed is:
1. A measuring circuit for converting input A.C. signals to D.C. signals comprising:
(a) an input resistor for deriving an input current proportional to the input A.C. signal to be converted to D.C.;
(b) a rectifier connected in series with said input resistor for half wave rectification of said input signal;
(c) an operational amplifier connected in parallel with said rectifier; and
(d) a coupling capacitor connected in series with said amplifier and between said rectifier and said amplifier in such a manner that the current through said rectifier substantially equals the input current signal over a half cycle and reverse currents are blocked.

2. The converter of claim 1, further comprising:
(e) filter means coupled to the output for smoothing the half wave rectified signal.

3. The converter of claim 1 further comprising:
(e) means for discharging said capacitor during negative half cycles of the input signal.

4. The converter of claim 1 further comprising:
(e) means for discharging said capacitor, for preventing saturation of said operational amplifier and compensating rectifier leakage currents including,
(1) a pair of zener diodes coupled in series opposition between output and input of said operational amplifier; and
(2) means diverting leakage current through said zener diodes to ground.

5. The converter of claim 1 further comprising:
(e) a second rectifier coupled in series with said rectifier for half wave rectification;
(f) a first filter having its input coupled between said rectifiers for smoothing the half wave rectified signal and to minimize leakage current through the first said rectifier by providing a low resistance path for reverse current relative to said first rectifier; and
(g) a second filter having its input coupled between said second rectifier and said capacitor and its output coupled in common with the output of said first filters, said filters being adapted to provide voltage doubling of the output.

6. A simple precision circuit for converting input electrical A.C. signals to D.C. signals comprising:
(a) means for deriving a current proportional to the input A.C. signal;
(b) a first rectifier connected in series with said resistor for providing half wave rectification of the input signal;
(c) a coupling capacitor;
(d) an operational amplifier in series with said capacitor, said amplifier and capacitor being connected in parallel with said first rectifier so as to produce half wave rectification without significant forward voltage drop through said rectifier;
(e) a second rectifier connected between the output and input of said amplifier for discharging said capacitor during negative half cycles.

7. An A.C. to D.C. converter comprising:
(a) an input terminal;
(b) an operational amplifier;
(c) an input resistor connected between said input terminal and the input of said amplifier;
(d) first rectifier means connected between the output and input of said amplifier;
(e) an output terminal;
(f) a capacitor connected between the output of said amplifier and said output terminal; and
(g) second rectifier means connected between the input to said amplifier and a point between said output terminal and said capacitor, said second rectifier having the terminal connected to said amplifier input which is of an opposite polarity relative to said first rectifier terminal connected to the amplifier input.

8. An A.C. to D.C. converter comprising:
(a) a rectifier connected for half wave rectification;
(b) an operational amplifier in parallel with said rectifier;
(c) a capacitor connected to the output of said amplifier;
(d) rectifier means to isolate the input signal from said rectifier and the converter output during the half cycle said rectifier is not conducting.

References Cited by the Examiner
UNITED STATES PATENTS

| | | | |
|---|---|---|---|
| 2,985,836 | 5/61 | Hatton | 307—88.5 |
| 3,036,224 | 4/62 | Abraham | 307—88.5 |
| 3,094,675 | 6/63 | Ule | 307—88.5 |

ARTHUR GAUSS, *Primary Examiner.*